A. B. OPPY.
CASTER.
APPLICATION FILED SEPT. 2, 1911.
1,033,264.
Patented July 23, 1912.
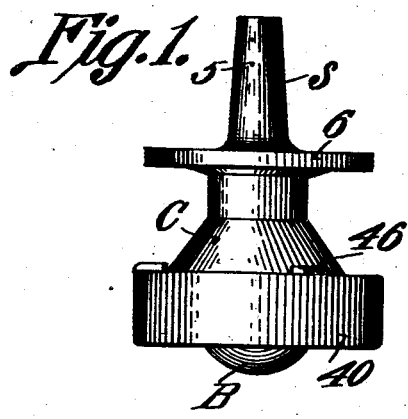
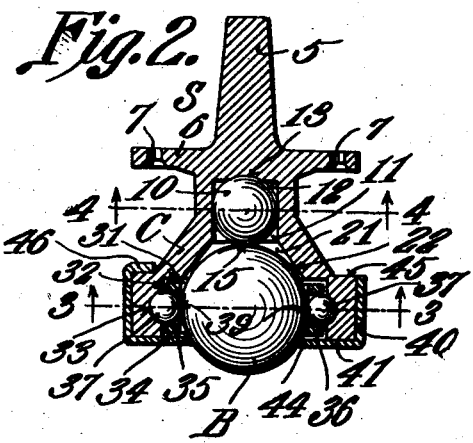
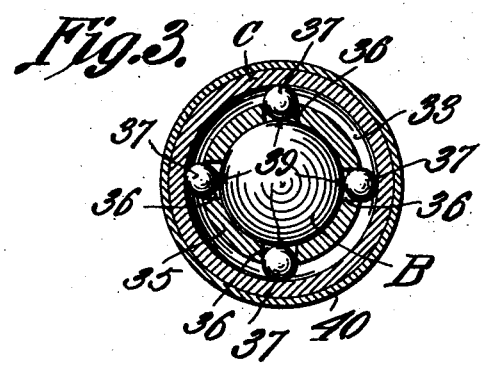
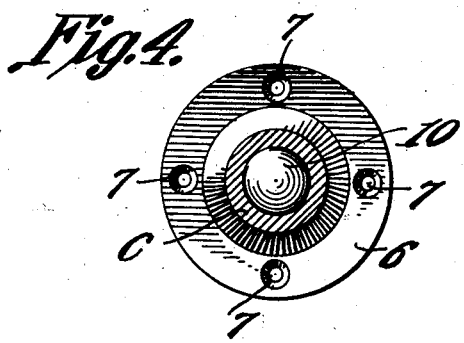
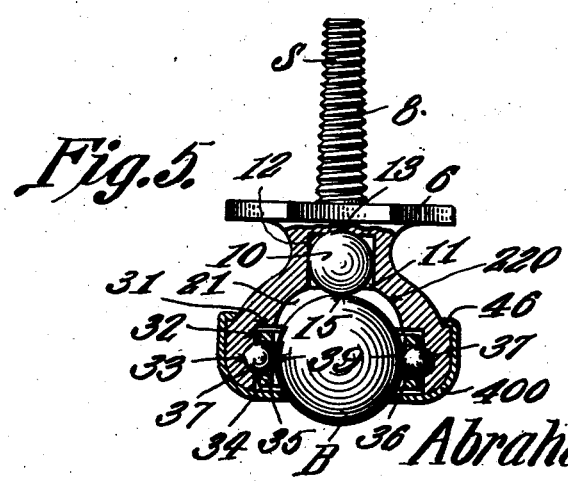
Abraham B Oppy,
Inventor
by _____
Attorneys
Witnesses:

UNITED STATES PATENT OFFICE.

ABRAHAM B. OPPY, OF KANSAS CITY, MISSOURI.

CASTER.

1,033,264.  Specification of Letters Patent.  Patented July 23, 1912.

Application filed September 2, 1911. Serial No. 647,434.

*To all whom it may concern:*

Be it known that I, ABRAHAM B. OPPY, a citizen of the United States, residing at Kansas City, in the county of Jackson and State of Missouri, have invented a new and useful Caster, of which the following is a specification.

This invention relates to builders' hardware, and more especially to casters; and the object of the same is to produce a ball caster wherein the ball bears against anti-friction devices which are in turn removably held in place in such manner as to reduce the friction to a minimum. This end I accomplish by the construction hereinafter more fully described and claimed, and as shown in the drawings wherein—

Figure 1 is a side elevation and Fig. 2 a central vertical section of one form of this improved caster. Figs. 3 and 4 are horizontal sections on the lines 3—3 and 4—4 of Fig. 2. Fig. 5 is a central vertical section through a slightly modified type of this invention, showing the stem and upper portion thereof in side elevation.

The stem S of this caster may be variously formed. In Fig. 2 it is shown as a plug 5 adapted to be driven into the lower end of the leg of a piece of furniture in a manner well understood, and a plate 6 surrounds said plug and has holes 7 for the insertion of screws or other similar devices by means of which the plate can be secured upon the leg. In Fig. 5 the stem is shown as a screw 8, and by preference the same plate 6 is employed although here it need not have the holes 7 for the screws as the threads of the main screw 8 will perform the service of holding the stem in place. It will be understood that the stem might be made in a variety of forms without in anywise affecting the principle of my invention, which I will now describe.

The ball B of this ball caster is revolubly mounted within a casing C as usual in casters of this type, excepting that the means I provide for taking the thrust or load from the superimposed piece of furniture and applying it to the ball is such as to bring the latter into as few points of contact within the surrounding members as possible, and consequently the construction of the casing will be modified to correspond. The caster ball B herein is the one which rests upon the floor, and is of some considerable size and preferably made of hardened steel. Directly above and in axial alinement with it is disposed a second and smaller ball 10, preferably also of hardened steel, which it may be well to distinguish throughout this specification by the term "thrust ball" because it receives the thrust or load. This ball 10 is mounted within a square chamber 11 formed within the casing C, the lower end of this chamber opening into or communicating with the somewhat larger chamber 21 which contains the ball B, and the upper end 12 of said chamber 11 being flat except for a cavity 13 in which the upper extremity of this thrust ball 10 rests as best seen in Fig. 2. The latter thus receives the direct thrust of the load, as the weight of the piece of furniture is communicated downward through the stem S, cavity 13, thrust ball 10, and by the latter to the caster ball B through the single point 15 of contact between them.

The chamber 21 referred to is herein shown as having conical walls 22, although that is a matter of preference so long as they do not come in contact with the caster ball B, and therefore as far as this description has proceeded said ball touches nothing but the thrust ball and touches that only at the point 15.

Below the chamber 21 the casing C is formed with an internal annular recess 31 having a straight upright outer wall 32 in which is cut a semi-circular groove 33, it being understood that this recess, its wall, and the groove therein extend completely around the caster ball. At its upper portion said recess communicates with the chamber 21, and at its lower portion said recess is open downward as at 34 in what might be called the mouth of the casing. Disposed within the recess is an annular collar 35 whose body is rectangular in cross section as seen in Fig. 2, and it is my intention to cut this collar quite accurately so that normally it shall not contact on its outer face with the outer wall 32 of the recess, on its inner face with the caster ball B, or on its upper and lower edges with anything; and through this collar are formed about four truly radial and cylindrical holes 36 as best seen in Fig. 3, their diameter corresponding accurately with that of four anti-friction balls 37 which are also made of hardened steel. These latter are of a diameter to fit closely and to run nicely within the semi-circular groove 33 above described, and said groove is so disposed and said balls are of such size that when in place they touch the caster ball at four points only as indicated by the numeral 39 in Fig. 3. It follows that as far as this description has proceeded, the caster ball therefore touches the thrust ball at one point and the anti-friction balls at four other points, so that it has contact at five points in all. If the collar be formed as neatly as it is my intention, its weight will be supported by the anti-friction balls 37 and it will constitute a spacer for holding them equi-distant from each other as they travel around within the groove 33; and while it is true that this collar may touch the caster ball or the wall 32, it can never touch either with any high degree of friction because its width radial of the device is less than half the diameter of the anti-friction balls 37 and they alone take the lateral thrust from the caster ball B.

For holding the parts in place I provide a cup 40 having a cylindrical body which surrounds the lower end of the casing C, and a flange or bottom 41 which is flat so as to extend across the lower end of said casing and across the lower edge of the collar 35 and is pierced with an opening 44 at its center, which opening is smaller than the mouth or open lower end 34 of the chamber 21 and is also smaller than any diameter of the caster ball B. The casing is by preference provided with a flat surrounding shoulder 45, and 46 designates lugs or ears formed upon the upper edge of the cup 40 and adapted to be bent over onto said shoulder 45 to hold the cup in place as best seen in Fig. 1. This cup is therefore by preference made of pliable material and will be suitably ornamented. I consider it essential that the opening 44 through the base or flange 41 of this cup shall be smaller than the diameter of the caster ball B so as to prevent the latter from dropping out of place, and also smaller than the largest diameter of the collar 35 so as to prevent that also from dropping out of place, but it will be understood that its ordinary function is merely to support said collar and not the caster ball B as the latter is borne upwardly in the constant use of the caster as a whole.

The manner of assembling the parts of this improved device is as follows: The caster (or the piece of furniture with the caster on it) being inverted, the thrust ball 10 is first dropped into the chamber 11, then the collar 35 is dropped into the annular recess 31, then the four anti-friction balls 37 are inserted in the holes 38 in the collar and borne radially outward until they enter the groove 33 in the casing C, then the caster ball is dropped into place and when in place it prevents any of the anti-friction balls from getting out of place, and finally the cup 40 is applied and its lugs 46 bent over onto the shoulder 45 to hold it in position. As seen in the sectional view in Fig. 2, this cup serves both to hold the collar 35 and anti-friction balls 37 in place and also to prevent the caster ball B from falling out when the furniture is lifted off the floor.

The modification illustrated in Fig. 5 is so slight that it hardly needs further explanation. Herein the upper chamber 11 is practically the same and has the cavity 13 at its apex, the caster ball B is again the same but is located within a chamber 21 whose wall 220 is rounded rather than being truly conical as shown in Fig. 2; the collar and the anti-friction balls are the same; and the cup instead of having an upright side wall with a flat flange, is slightly rounded as at 400 at its lower corner, although here again it has the lugs 46 to hold it in place upon the casing C.

What is claimed is:

1. A caster including a casing having an interior annular groove, a ball loosely mounted in the casing and projecting therebelow, means for retaining the ball within the casing, anti-friction balls mounted to travel within the groove and contacting with the first named ball to space it from the casing, and means carried by and movable with the spacing balls for holding them out of contact with each other, said means being supported out of contact with the casing and with the first named ball.

2. In a ball caster, the combination with a casing having an internal chamber for the caster ball, a smaller chamber above and in the axis of said caster-ball chamber and communicating therewith, a cavity at the top of said chamber, and an annular recess below said caster-ball chamber and opened downward through the mouth of the latter; of the caster-ball located within its chamber, a thrust ball located in said smaller chamber and resting in the cavity thereof, a series of anti-friction balls, a spacer for them, these balls and their spacer traveling in said recess, a cup having a flange extending across the lower end of said casing beneath said spacer and whose opening is smaller than any diameter of said caster ball, and means for holding the cup removably upon the casing.

3. In a ball caster, the combination with the casing having a chamber for the caster ball, a smaller chamber above and communicating with it, an annular recess beneath and communicating with the caster-ball chamber and having an upright outer wall with a semi-circular groove in it, the lower end of this recess opening at the bottom of the casing, and a shoulder surrounding the latter; of the caster ball located in its chamber, a thrust ball above and in axial alinement with it, a series of anti-friction balls seated in said groove, and contacting with the sides of the caster ball, a spacer consisting of a collar rectangular in cross section and having radial holes through it, of a size to closely inclose said anti-friction balls, the thickness of this collar being less than the radius of these balls and its outer circumference less in size than said wall, and a cup whose body surrounds the casing, whose bottom extends beneath it and beneath said collar and has an opening less in size than any diameter of said caster ball, and whose upper edge has lugs bent over upon said shoulder.

In testimony that I claim the foregoing as my own, I have hereto affixed my signature in the presence of two witnesses.

ABRAHAM B. OPPY.

Witnesses:
RUDOLF PFEIFFER,
OTIS E. CRONK.